(12) United States Patent
Kok et al.

(10) Patent No.: US 7,109,465 B2
(45) Date of Patent: Sep. 19, 2006

(54) SYSTEM AND METHOD FOR CONVERTING AMBIENT LIGHT ENERGY INTO A DIGITIZED ELECTRICAL OUTPUT SIGNAL FOR CONTROLLING DISPLAY AND KEYPAD ILLUMINATION ON A BATTERY POWERED SYSTEM

(75) Inventors: Boon How Kok, Singapore (SG); Soon Lee Tan, Singapore (SG); Wee Sin Tan, Singapore (SG)

(73) Assignee: Avago Technologies ECBU IP (Singapore) Pte., Ltd., Singapore (SG)

( * ) Notice: Subject to any disclaimer, the term of this patent is extended or adjusted under 35 U.S.C. 154(b) by 226 days.

(21) Appl. No.: 10/407,540

(22) Filed: Apr. 4, 2003

(65) Prior Publication Data
US 2004/0195494 A1 Oct. 7, 2004

(51) Int. Cl.
*G01J 1/44* (2006.01)

(52) U.S. Cl. .................. 250/214 AL; 345/102

(58) Field of Classification Search ......... 250/214 AL, 250/214 B, 239, 214 DC, 205; 348/602; 345/102
See application file for complete search history.

(56) References Cited

U.S. PATENT DOCUMENTS

| | | | | |
|---|---|---|---|---|
| 4,514,727 | A | * | 4/1985 | Van Antwerp ............... 345/691 |
| 5,491,330 | A | * | 2/1996 | Sato et al. ............ 250/214 AL |
| 5,654,786 | A | * | 8/1997 | Bylander ...................... 351/49 |
| 5,760,760 | A | * | 6/1998 | Helms ......................... 345/102 |
| 5,933,089 | A | * | 8/1999 | Katada ........................ 340/7.55 |
| 6,157,850 | A | * | 12/2000 | Diab et al. .................. 600/323 |
| 2002/0071059 | A1 | * | 6/2002 | Furuya et al ............... 348/602 |

* cited by examiner

*Primary Examiner*—Thanh X. Luu

(57) ABSTRACT

A system and method of ambient light detection with digitized output. A light sensitive device is coupled to electronic circuitry for receiving an output of the light sensitive device corresponding to a level of ambient light. The electronic circuitry compares the output to a threshold level. The threshold level corresponds to a desired level of light. The electronic circuitry for provides an output signal indicative of said desired level of light.

16 Claims, 5 Drawing Sheets

SYSTEM AND METHOD FOR CONVERTING AMBIENT LIGHT ENERGY INTO A DIGITIZED ELECTRICAL OUTPUT SIGNAL FOR CONTROLLING DISPLAY AND KEYPAD ILLUMINATION ON A BATTERY POWERED SYSTEM

TECHNICAL FIELD

Embodiments of the present invention relate to power management of battery powered computer systems.

BACKGROUND ART

Most battery powered computer systems, for example, laptop computers, personal digital assistants, mobile phones, pager devices and the like, have some type of display light to assist a user in viewing the display contents under conditions of inadequate ambient light. Such lights are often referred to as "backlights," and less frequently as "frontlights." In addition, some battery-powered computers, e.g., mobile phones, may illuminate a keypad as an aid to usage under less than ideal ambient lighting conditions. Examples of such light sources include cold cathode florescent tubes, electro-luminescent panels and light emitting diodes.

When operating, these light sources can oftentimes consume high levels of power from the device's limited battery capacity. As a consequence, some such battery powered computer systems are designed to detect ambient light levels, and to turn off device lighting if there is sufficient ambient light for a user to view the display (and/or keypad) without system lighting.

Conventionally, a silicon photodiode or silicon phototransistor has been coupled to an analog to digital converter in order to provide a measurement of ambient light levels to such battery powered computer systems. Silicon-based photo-sensitive devices are commonly available and are familiar to many practitioners of the electronic arts. Further, use of such silicon-based photo-sensitive devices is illustrated in many design "cook books" commonly used by engineers.

Unfortunately, silicon-based photo-sensitive devices generally do not match the response of the human visual system to varying sources and wavelengths of light. For example, a silicon-based photo-sensitive device will detect or measure approximately 5% of the light intensity from florescent lighting as will the human eye. As a deleterious result, such a silicon-based photo-sensitive light measurement system may falsely report that there is insufficient ambient light for viewing a display under florescent light, when in fact there is plenty of light for the human user. In such a situation, the computer system may unnecessarily provide display lighting, unnecessarily consuming limited battery power, and unnecessarily reducing the operating time of the battery powered computer system.

Likewise, for some common light sources, e.g., halogen lighting, silicon-based photo-sensitive devices are more sensitive to the light energy than the human eye. In such cases, the computer system may deleteriously determine that there is sufficient ambient light for viewing a display, when in fact there is not. The detrimental result is that the computer system may not provide display lighting, and the user will be unable to view the display.

A further disadvantage of many conventional systems is the common use of an analog to digital converter to functionally couple a light sensitive device to a processor. Analog to digital converters as commonly used in this application are typically slow, requiring a conversion cycle that is very long compared to the operating speed of a modern computer processor. The analog to digital converter frequently requires an external clock source to control the conversion process. These characteristics may require additional software complexity to initiate, control and receive a converted light measurement.

In addition, since the output of most analog to digital converters is a multi-bit value, e.g., typically from eight to 12 bits, accessing the value is complex. For example, if the value is accessed serially, a universal asynchronous receiver/transmitter (UART) or other serial interface port may need to be dedicated to the analog to digital converter. Alternatively, some analog to digital converters may be interfaced in parallel, requiring, e.g., eight to 12 additional wiring channels on a printed circuit board. As an undesirable result, using an analog to digital converter for this application suffers an increase in design complexity, cost, and consumes excessive development resources.

Thus a need exists for a method and system of ambient light detection with digitized output. A further need exists to meet the previously identified need that is complimentary and compatible with conventional computer system design techniques. In conjunction with the aforementioned needs, a still further need exists for detecting ambient light with sensitivity that closely matches the sensitivity of the human visual system.

SUMMARY OF THE INVENTION

Embodiments of the present invention provide a method and system of ambient light detection with digitized output. Embodiments of the present invention further provide for the previously identified solutions in a manner that is complimentary and compatible with conventional computer system design techniques. Still further embodiments of the present invention provide for detecting ambient light with sensitivity that closely matches the sensitivity of the human visual system.

A system and method of ambient light detection with digitized output are disclosed. A light sensitive device is coupled to electronic circuitry for receiving an output of the light sensitive device corresponding to a level of ambient light. The electronic circuitry compares the output to a threshold level. The threshold level corresponds to a desired level of light. The electronic circuitry for provides an output signal indicative of said desired level of light.

BEST MODES FOR CARRYING OUT THE INVENTION

Figure 1:
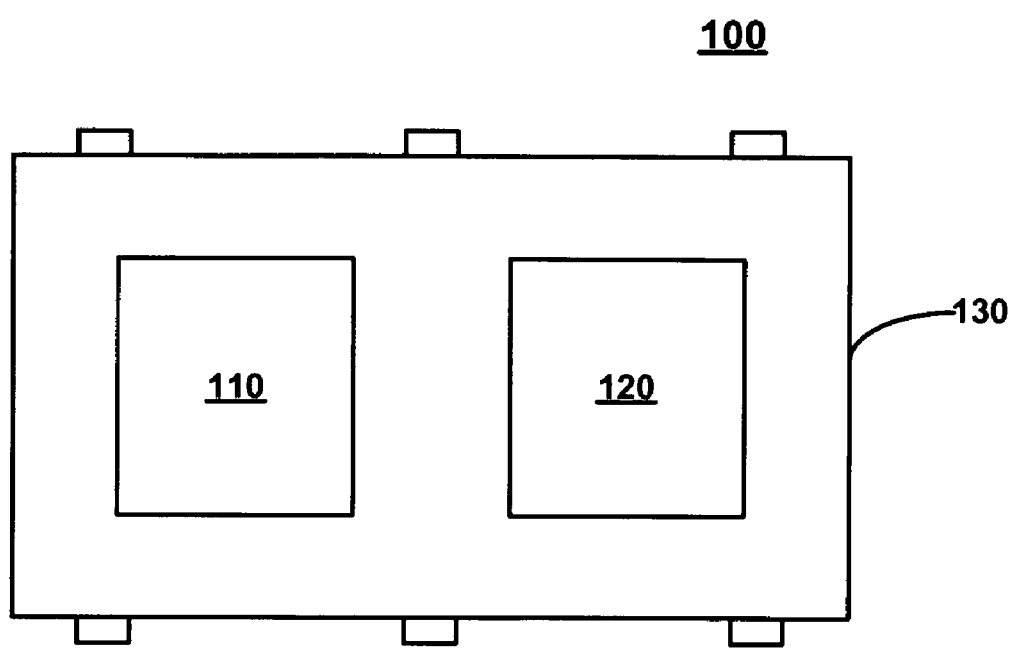
FIG. 1 illustrates an exemplary ambient light detection with digitized output device, according to an embodiment of the present invention.

FIG. 1 illustrates an exemplary ambient light detection with digitized output device 100, according to an embodiment of the present invention. Device 100 comprises photo sensitive device 110 and integrated circuit 120. Advantageously, photo sensitive device 110 should be a gallium arsenide phosphate (GaAsP) device, e.g., a GaAsP photodiode. A GaAsP device may be constructed with a response to light energy that is very similar to human visual response. Beneficially, the use of a light sensitive device with a response characteristic similar to that of a user overcomes many defects of the conventional art. More particularly, many false indications of the need for device lighting are eliminated. As a desirable result, battery power, previously consumed in such situations, may be conserved, extending the useful operating time of battery powered devices.

Similarly, many false indications of sufficient ambient light, e.g., a false indication that device lighting is not required, are also avoided. As a desirable result, a user may be able to view a display and/or see a keypad with the aid of device lighting in situations in which such user would have been unable to do so under the conventional art. Consequently, usability and market acceptance of devices practicing embodiments of the present invention are enhanced.

Replacing a conventional-art silicon-based light sensitive device with a gallium arsenide phosphate light sensitive device in conventional designs is contra indicated. Silicon and GaAsP devices typically function at incompatible voltage and current operating points. Hence, a conventional circuit disposed to operate with a silicon-based light sensitive device is ill-suited to operate with a GaAsP device.

Integrated circuit device 120 overcomes many of these difficulties. More particularly, integrated circuit device 120 is adapted to receive an electrical output of a GaAsP photo diode, e.g., photo sensitive device 110, and provide a logic, e.g., digital, output signal to indicate the presence of sufficient ambient light.

Packaging 130 of device 100 is well suited to conventional semiconductor packaging as well as other, less common forms of packaging. For example, integrated circuit device 120 may be mounted to a printed circuit board by various means, e.g., direct chip attach. Photo sensitive device 110 should be located close to integrated circuit device 120 to minimize electrical noise. However, it to be appreciated that photo sensitive device 110 need not be mounted to the same structure as integrated circuit device 120, according to embodiments of the present invention.

Combining integrated circuit device 120 and photo sensitive device 110 into common packaging has many advantages over the conventional art, as well as advantages over embodiments of the present invention without common packaging. Characteristics of integrated circuit device 120, e.g., amplifier gain (to be more fully described below) may be chosen to optimally match characteristics of photo sensitive device 110. In addition, handling, e.g., during manufacturing, of a single common package is faster, more reliable and offers greater economy that would be necessary for handling two separate devices. Further, interconnecting coupling between integrated circuit device 120 and photo sensitive device 110 may be made shorter within a semiconductor package than is typically possible between such packages. Such coupling saves printed circuit board wiring channels, which are often a critical resource within battery powered computers. In addition, short wiring lengths between integrated circuit device 120 and photo sensitive device 110 contribute to enhanced noise characteristics in the application.

Figure 2:
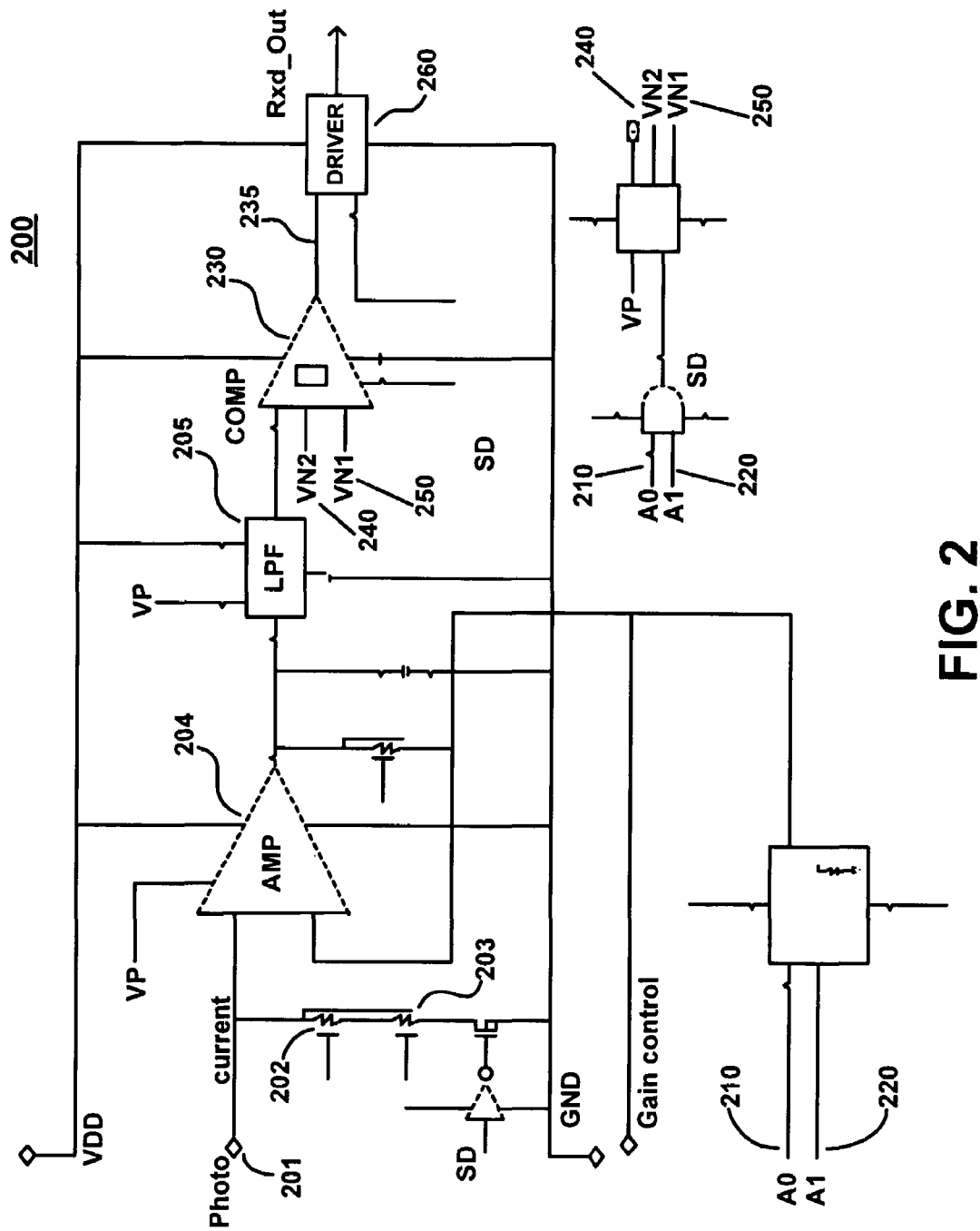
FIG. 2 illustrates a schematic 200 of integrated circuit device 120, according to an embodiment of the present invention.

FIG. 2 illustrates a schematic 200 of integrated circuit device 120, according to an embodiment of the present invention. Integrated circuit device 120 may be implemented in a semiconductor process optimized for mixed signal operation, e.g., 0.6 μm BiCMOS. Embodiments of the present invention are well suited to other semiconductor processes as well.

A current corresponding to light (photo) energy of a light sensitive device, e.g., a photodiode, is accessed at node 201. Node 201 may be coupled, for example, to photo sensitive device 110. The current across selectable resistors 202 and 203 represents a voltage corresponding to the light energy. By selectively coupling selectable resistors 202 and/or 203, the voltage to light energy relationship (gain) may be advantageously adjusted.

Amplifier 204 amplifies the voltage signal which is then passed through low pass filter 205. Low pass filter 205 may prevent a flicker effect of device lighting, for example, if a computer system is moved, e.g., rotated, causing brief shadowing of the photo sensor.

Control signals 210 and 220 (address 0 and 1, respectively) access control signals to select selectable resistors 202 and/or 203. A particular combination of signals at nodes 210 and 220 may also select a low power quiescent mode referred to as a "shutdown" mode. In shut down mode, IC 120 consumes minimal power. Shutdown mode may be advantageously employed, for example, to minimize power consumption and to keep device lighting off when no information is displayed. Table 1, below, illustrates an exemplary decoding of control signals 210 and 220.

TABLE 1

| Control Signal 210 (A0) | Control Signal 220 (A1) | Result |
| --- | --- | --- |
| 0 | 0 | Select resistor 202 |
| 0 | 1 | Select resistor 203 |
| 1 | 0 | Select both resistors |
| 1 | 1 | Shut Down |

Comparator 230 compares the amplified and filtered voltage corresponding to light energy to a threshold voltage. The threshold voltage may be either $V_N 1$ 250 or $V_N 2$ 240, as selected by control signals 210 and 220. The threshold voltage levels should be determined to correspond to desired ambient light levels.

The output of comparator 230, signal 235 indicates if the light energy received by a photo sensitive device is greater than or less than a desired ambient light level. Driver stage 260 drives and buffers signal 235 to provide a signal compatible with voltage and drive levels of digital logic, e.g., a microprocessor. Such a digital output may be readily direct coupled to digital circuitry. This is in contrast to the conventional art wherein an analog to digital converter is typically utilized to convert a photodiode output into a digital format. Such direct coupling leads to a straight forward design and implementation.

It is to be appreciated that different types of digital logic may require differing embodiments of driver 260. Likewise, comparator 230 may be capable of directly driving a particular type of logic. All such arrangements are well suited to embodiments of the present invention.

Figure 3:
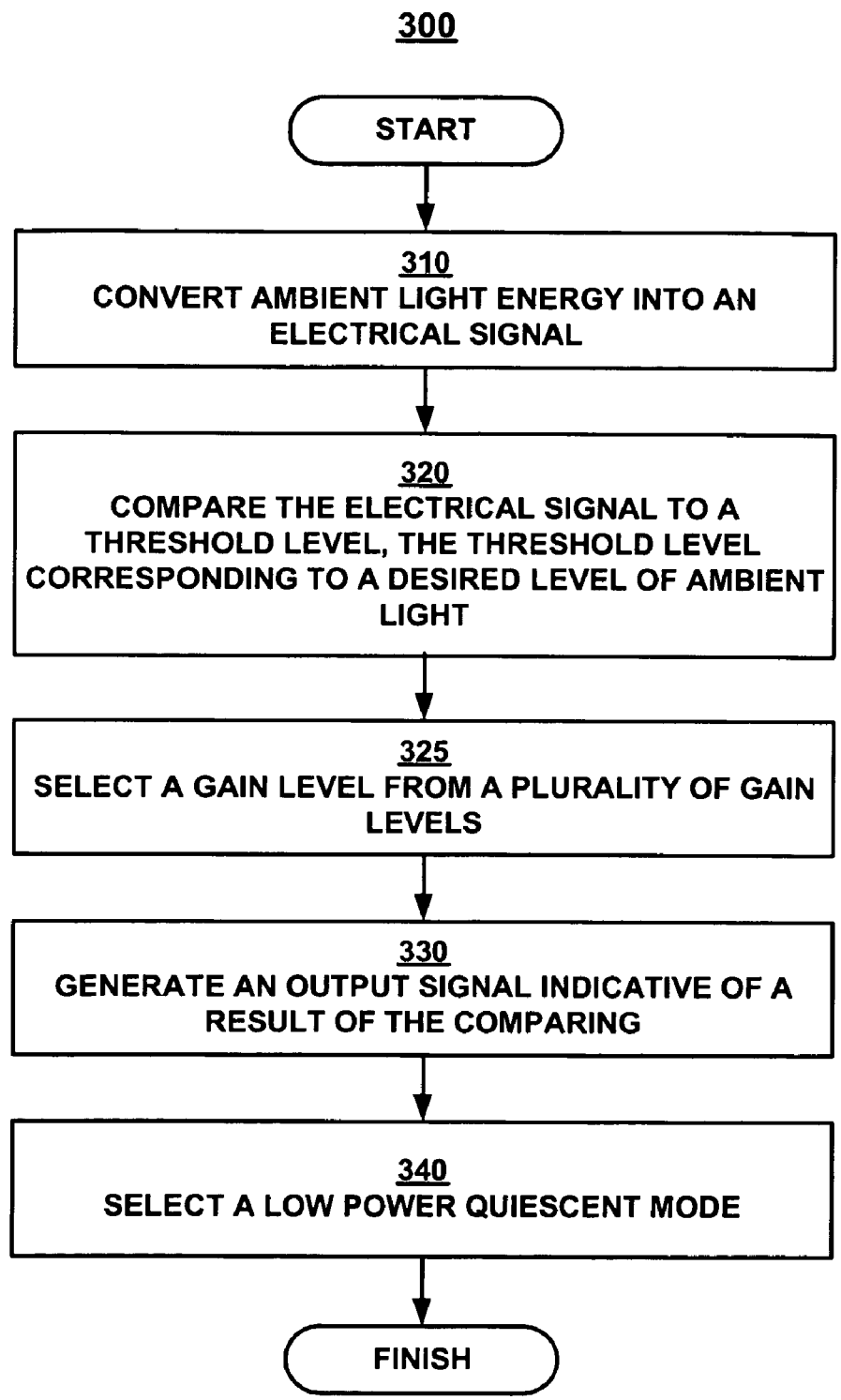
FIG. 3 illustrates a method of determining presence of desirable ambient light, according to an embodiment of the present invention.

FIG. 3 illustrates a method 300 of determining presence of desirable ambient light, according to an embodiment of the present invention.

In step 310, ambient light energy is converted into an electrical signal. Conversion devices and/or processes may generally be described in terms of a response curve. For example, the response curve of a device describes an electrical output in terms of light energy (wavelength and intensity) input to the device. The conversion process should have sensitivity characteristics (e.g., a response curve) similar to the visual response of the human visual system. Gallium arsenide phosphate photodiodes are an example of a device type which converts light energy into an electrical signal with such sensitivity characteristics. Embodiments of the present invention are well suited to other types of devices or processes to convert light energy into electrical signal(s).

In step 320, the electrical signal produced in step 310 (which corresponds to an ambient light level) is compared to a threshold level. The threshold level corresponds to a desired level of ambient light. The threshold level may be established, for example, by a calibration process. For example, if a desirable level of ambient light, e.g., for viewing a display, is determined to correspond to a voltage level of 1.0 volts, a threshold level may be established at 1.0 volts. The electrical signal produced in step 310 is compared to this threshold level. The comparison determines the relationship between the present light electrical signal and the threshold level signal. For example, the comparison may determine that the electrical signal (corresponding to ambient light) is greater than the threshold level. It is to be appreciated that embodiments of the present invention are well suited to various comparisons, e.g., less than, greater than, less than or equal, greater than or equal and the like.

In optional step 325, a gain level is selected from among a plurality of gain levels. Such a capability may allow, for example, a particular integrated circuit device 120 (of FIG. 1) to operate with a variety of photo sensitive devices, having differing electrical output characteristics in relation to light sensed. This may allow production of embodiments of the present invention with multiple sources of photo sensitive devices, beneficially allowing a manufacturer advantageous flexibility of supply.

A capability of gain adjustment may additionally allow a particular embodiment of the present invention, e.g., one model of device 100 of FIG. 1, to be utilized in a variety of products. For example, a first computer system design using a particular model of device 100 may orient device 100 such that it is exposed to ambient light through the "bottom" of the first computer system design. A second computer system design may orient the same model of the same device such that it is exposed to ambient light through the "front" of the second computer system. It is likely that under identical lighting conditions, the light sensitive devices in the first computer system design and in the second computer system design will receive differing levels of light energy, and consequently produce different levels of output electrical signals corresponding to those differing levels of light energy. A capability of gain adjustment may enable the same model of device to be used in both the first and the second computer designs, beneficially increasing the market acceptance for embodiments of the present invention.

In step 330 of FIG. 3, an output signal indicative of a result of the comparison performed in step 320 is generated. For example, comparator 230 of FIG. 2 generates signal 235. It is to be appreciated that embodiments of the present invention are well suited to other types or locations of such a signal. For example, the output of driver 260 in FIG. 2 is also an output signal indicative of a result of the comparison performed in step 320. Additionally, a bit in computer memory corresponding to such an output, e.g., the output of driver 260, also provides such an output signal when accessed.

It is to be further appreciated that embodiments of the present invention are well suited to various logical relationships between such output signals and ambient light levels. For example, a "low" level output may indicate that an ambient light level is detected as being above a desirable light level. Similarly, a light level comparison may be made as a current and/or with a reversed logical relationship.

In optional step 340, a low power quiescent mode may be selected. A low power quiescent or "shutdown" mode may be advantageously employed, for example, to minimize power consumption and to keep device lighting off when no information is displayed. In is to be appreciated that embodiments of the present invention are well suited to a variety of low power mode implementations and also to a variety of control schemes. For example, a low power quiescent mode may be selected externally to a device, or it may automatically enter such a mode responsive to a time delay after a significant change in ambient light levels.

Figure 4A:
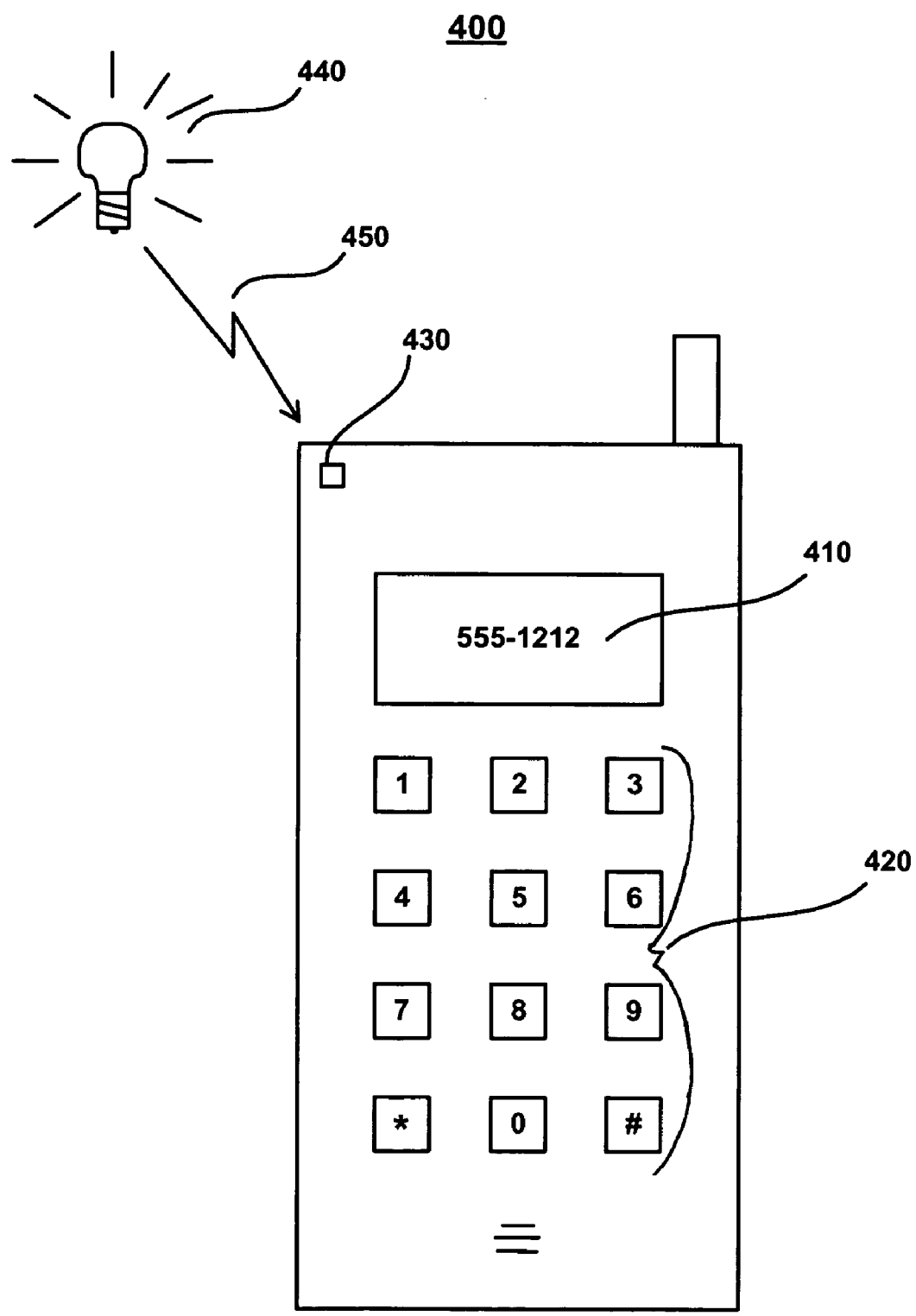
FIGS. 4A and 4B illustrates an exemplary battery powered computer system which may utilize embodiments of the present invention.
Figure 4B:
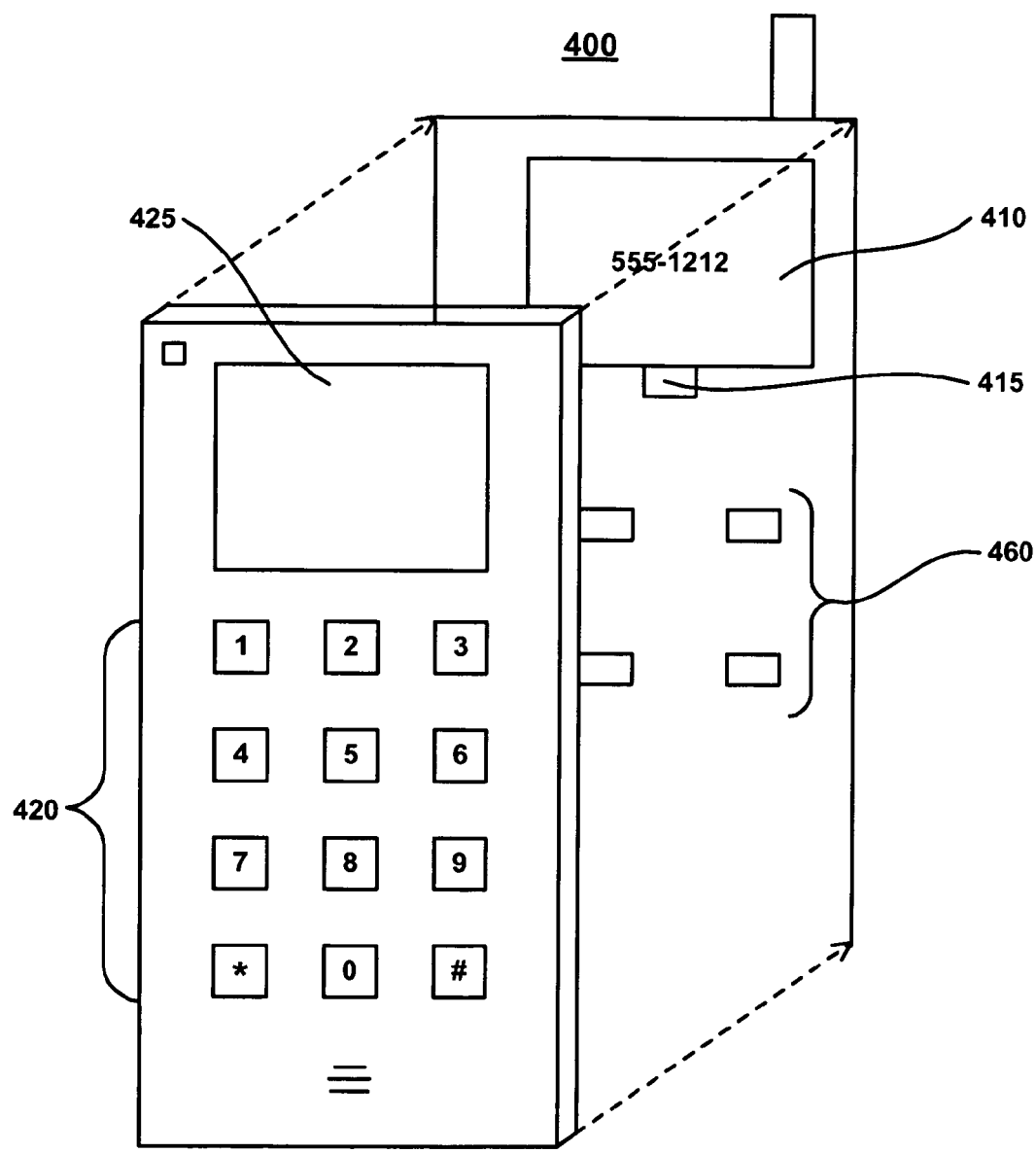

FIGS. 4A and 4B illustrates an exemplary battery powered computer system 400 which may utilize embodiments of the present invention. In the embodiment illustrated in FIGS. 4A and 4B, the battery powered computer system 400 is a cell phone. The system 400 in FIG. 4A is assembled, while the system 400 in FIG. 4B is partially exploded to reveal light emitting diodes 415 and 460 situated behind the faceplate 425 of the system 400.

System 400 comprises a display 410 for presenting visual information to a user. Display 410 may be any of a variety of well known display types, for example a liquid crystal display (LCD) operating in a reflective mode. System 400 is capable of illuminating display 410, for example, via conventional backlight light emitting diode(s) 415 situated behind the faceplate 425 of system 400, coupling light to the front of display 410 (when energized). Light from such an illumination source may be provided to enable a user to view the display 410 under conditions of insufficient ambient illumination 440.

System 400 also comprises a keypad 420. System 400 is capable of illuminating keypad 420, for example, via a conventional backlight array of light emitting diode(s) diodes 460 situated behind the faceplate 425 of the system 400, coupling light to the back of the individual keys. Light from such an illumination source may be provided to enable a user to view the keypad 420 under conditions of insufficient ambient illumination.

Under certain conditions such as at night in a car, the illumination of backlight display lighting system 415 and/or backlight keypad lighting system 460 may be necessary for use of system 400. However, the lighting systems 415 and 460 typically consume large amounts of power from system 400's battery. It is not uncommon for such lighting systems, when on, to dominate the energy usage of such computer systems. Consequently, it is highly desirable to not use, or to turn off, such lighting when device illumination is not required.

One such circumstance under which device illumination is not required occurs when the computer system is being used under high levels of ambient illumination, e.g., on a sidewalk in broad daylight, or in a well illuminated office. Under such circumstances battery power may be advantageously saved if the device lighting is not used.

Battery powered computer system 400 further comprises an embodiment of the present invention, ambient light detector 430. Ambient light detector 430 is disposed to receive ambient light falling upon system 400. For example, there may be a small window of transparent material over ambient light detector 430.

A source 440 of ambient light produces light energy 450. Light energy 450 may fall upon system 400 and be received by ambient light detector 430. If light energy 450 achieves a desired level of ambient light, ambient light detector 430 may signal a processor within system 400 of such level of ambient light. The processor may subsequently turn off, or not turn on, device lighting 415 to display 410 and/or device lighting 460 to keypad 420.

Embodiments of the present invention provide for a method and system of ambient light detection with digitized output. Embodiments of the present invention further provide for the previously identified solutions in a manner that is complimentary and compatible with conventional computer system design techniques. Still further embodiments of the present invention provide for detecting ambient light with sensitivity that closely matches the sensitivity of the human visual system.

Embodiments of the present invention, ambient light detection with digitized output, are thus described. While the present invention has been described in particular embodiments, it should be appreciated that the present invention should not be construed as limited by such embodiments, but rather construed according to the below claims.

What is claimed is:

1. A method of illuminating a display on a battery powered system, comprising:
   converting ambient light energy into an electrical signal with a Gallium Arsenide Phosphate (GaAsP) photodiode;
   accessing said electrical signal from said GaAsP photodiode via a node on an integrated circuit device;
   amplifying said electrical signal from said GaAsP photodiode with an amplifier in said integrated circuit device;
   filtering said electrical signal from said GaAsP photodiode with a low pass filter in said integrated circuit device, wherein said filtering prevents a flicker effect on said signal from flickering ambient light conditions;
   comparing said amplified, filtered electrical signal to a threshold level with a comparator in said integrated circuit device, said threshold level corresponding to a pre-determined level of ambient light;
   generating an output signal from said comparator indicating whether said ambient light is greater than or less than said threshold level;
   driving and buffering said output signal at a driver stage in said integrated circuit device, wherein said driving and buffering generates a signal compatible with voltage and drive levels required for digital logic;
   direct coupling said output signal with a processor, wherein said processor comprises digital logic circuitry;
   activating an illumination source if said ambient light is less than said threshold level, wherein said activation is performed by said processor.

2. The method of claim 1 further comprising:
   selecting a gain level from a plurality of gain levels to amplify said electrical signal.

3. The method of claim 2 wherein said selecting comprises: utilizing a digital input to select said gain level.

4. The method of claim 1 further comprising:
   selecting a low power quiescent mode subsequent to said generating.

5. The method of claim 1, wherein said illumination source comprises a backlight LED for illumination of said display.

6. The method of claim 1, wherein said battery powered system further comprises a keypad and a backlight LED array for illumination of said keypad, wherein said activation of said illumination source backlights said keypad.

7. A battery powered computer system comprising:
   a processor;
   an ambient light detection device comprising a Gallium Arsenide Phosphate (GaAsP) photodiode disposed to receive ambient light falling upon said computer system;
   an integrated circuit device comprising
      a node for accessing a current corresponding to light energy of said GaAsP photodiode;
      a resistor for adjusting a voltage to light energy relationship of said current;
      an amplifier for amplifying said current;
      a low pass filter for filtering said current to prevent a flicker effect on said current due to said light received at said GaAsP photodiode;
      a comparator for comparing a voltage of said current after said amplifying and said filtering to a threshold voltage and for generating an output signal, wherein said output signal indicates if said light energy received by said GaAsP photodiode is greater than or less than a desired ambient light level; and
      a driver stage for driving and buffering said output signal to make said output signal compatible with voltage and drive levels of said processor, wherein said processor is direct coupled with said output signal after said driving and said buffering; and
   an illumination source controlled by said processor, wherein if said output signal indicates that said light energy received by said GaAsP photodiode is less than a desired ambient light level, said illumination source is activated.

8. The computer system of claim 7 wherein said ambient light detection device is contained in a semiconductor package.

9. The computer system of claim 7 wherein said electronic circuitry further comprises:
   a selectable gain control for determining amplification of said electrical signal.

10. The computer system of claim 9 wherein said selectable gain control is selected via digital input.

11. The computer system of claim 7 wherein said electronic circuitry further comprises:
    a selectable low power quiescent mode.

12. The battery powered computer system of claim 7 further comprising a display, wherein said activation of said illumination source backlights said display.

13. The batter powered computer system of claim 7 wherein said display is a liquid crystal display.

14. The battery powered computer system of claim 7 further comprising a keypad, wherein said activation of said illumination source backlights said keypad.

15. The battery powered computer system of claim 7 wherein said battery powered computer system is a mobile telephone.

16. The battery powered computer system of claim 7 wherein said battery powered computer system is a personal digital assistant.

* * * * *